United States Patent [19]

Hanewinkel

[11] 4,041,406
[45] Aug. 9, 1977

[54] METHOD AND APPARATUS FOR THE DETERMINATION OF THE TRANSITION OF DIGITAL DATA SIGNALS MODULATED WITH TWO DIFFERENT SIGNAL FREQUENCIES

[75] Inventor: Lorenz Hanewinkel, Paderborn, Germany

[73] Assignee: Nixdorf Computer AG, Paderborn, Germany

[21] Appl. No.: 701,567

[22] Filed: July 1, 1976

[30] Foreign Application Priority Data

July 3, 1975 Germany .......................... 2529784

[51] Int. Cl.² ...................... H03K 9/06; H04L 27/14
[52] U.S. Cl. .............................. 329/107; 178/66 A; 325/320
[58] Field of Search ................ 329/104, 107; 325/30, 325/320; 178/66 A

[56] References Cited

U.S. PATENT DOCUMENTS

| 3,908,169 | 9/1975 | Tong | 329/104 X |
| 3,979,685 | 9/1976 | Motley et al. | 325/320 X |

Primary Examiner—Siegfried H. Grimm
Attorney, Agent, or Firm—Gifford, Chandler, Sheridan & Sprinkle

[57] ABSTRACT

A method and apparatus are provided for detecting the transition of digital data signals the two states of which are modulated with two different signal frequencies from one signal frequency to the other signal frequency. Timing elements generate comparison pulses having a first and second duration at each pulse front of the modulated data signal during a second and first signal frequency respectively. The comparison pulses in turn are used to generate control pulses so that the leading edge of the control pulse coincides with the leading edge of the comparison pulse, and likewise, the trailing edge of the control pulse coincides with the trailing edge of the comparison pulse. The control pulses are fed to the up/down counting direction control input of a reversible counter having a clock signal connected to its input. A pair of comparators compare the contents of the reversible counter with a pair of preset separate threshold levels. The comparators generate an output signal upon the attainment of a threshold level in the reversible counter which attainment is interpreted as a transition from one signal frequency to the other signal frequency. The determination of a transition from one signal frequency to the other signal frequency is also utilized to change the duration of the comparison pulse to the duration of the other comparison pulse.

23 Claims, 6 Drawing Figures

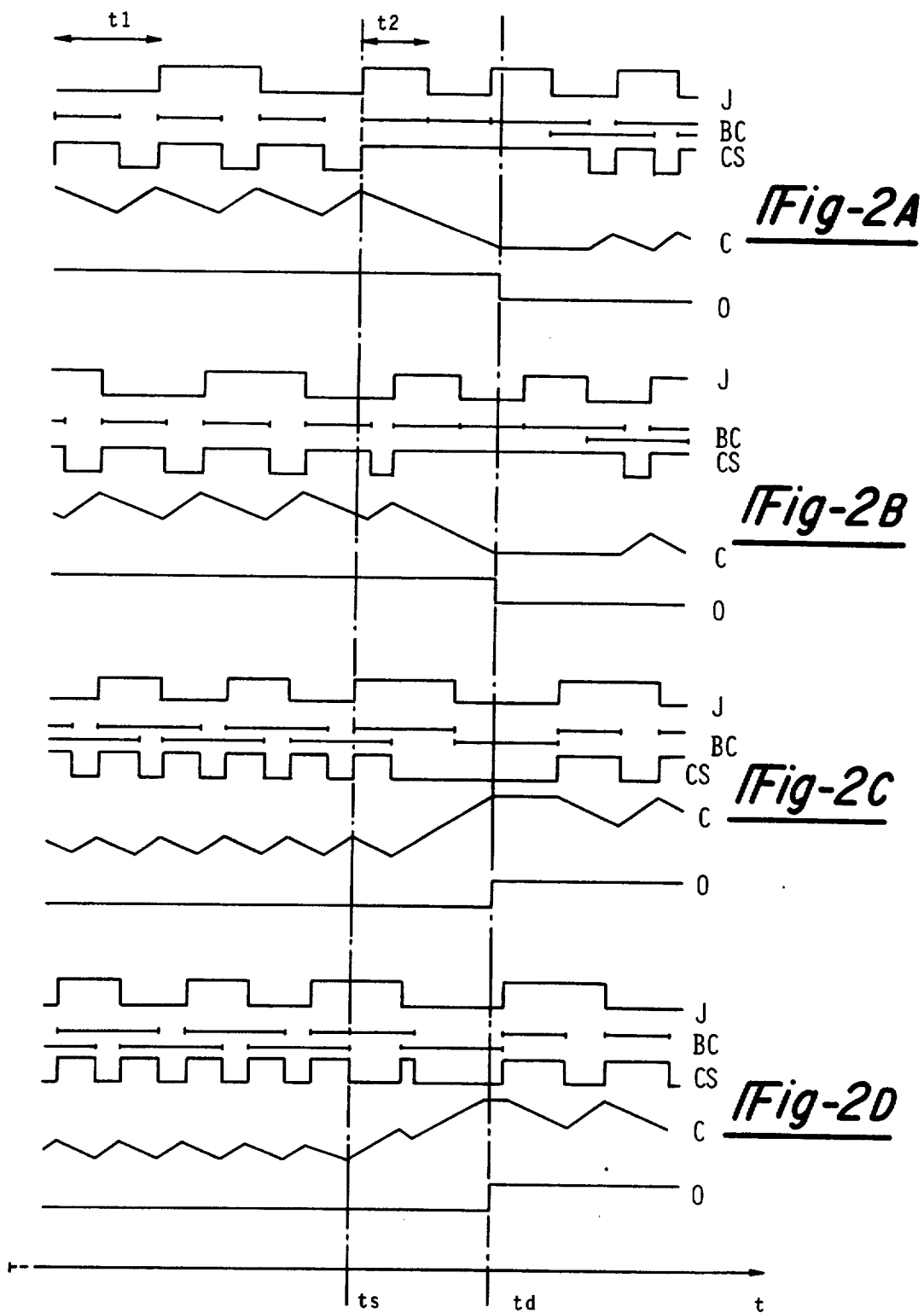

METHOD AND APPARATUS FOR THE DETERMINATION OF THE TRANSITION OF DIGITAL DATA SIGNALS MODULATED WITH TWO DIFFERENT SIGNAL FREQUENCIES

BACKGROUND OF THE INVENTION

1. Field of the Invention

The present invention relates generally to a demodulator for a frequency encoded data signal, and more particularly, to a means and process for determining the transition of the data signal between a first and second predetermined signal frequencies.

2. Description of the Prior Art

Frequency modulation is often applied to the transmission of binary data signals. Depending upon the binary notation, two frequencies are utilized so that during the modulation, impulses are formed with a period determined by the respective signal frequency. Data signals transmitted in such a form are typically fed to a limiting amplifier contained in the signal receiver, which amplifier generates a square wave signal.

Previously, the amplified and frequency-modulated signals have been demodulated by two oscillating circuits one of which resonates at one of the selected signal frequencies while the other resonates at the other selected frequency. Then, a low-pass filter arrangement connected on the output side of the oscillators transmits the demodulated data.

Other previously known devices demodulate the two signal frequencies by means of a filter which is turned to a frequency chosen between the two signal frequencies.

The primary disadvantage of the previously known processes employing oscillating circuits or filter circuits is that the data signals in these circuits are oftentimes distorted by transient phenomena, i.e. by building up and decaying processes. Any satisfactory evaluation within very short time intervals is impossible since the respective actual signal information is distorted by the preceding information which still remains as a signal voltage due to the storage effect of capacitors and inductors. Thus considerable difficulties are encountered when striving for a high digital data transmission rate such that the time interval for one bit reaches the order of magnitude of a period of the respective signal frequency. Moreover, in the case of the filter process, a complicated multistage filter is required when the evaluation of the transitions between the two signal frequencies must be in the proper phase relation.

The determination of the exact phase of the transition between the two frequencies is especially important for phase-coherent signals. In this case, during a high speed transmission rate, upon a frequency transition there still remains a transmission signal on the carrier frequency line capable of distorting the data signals to an especially high degree.

Still other previously known devices utilize a zero-passage discriminator for the demodulation of frequency-modulated signals. Such a discriminator counts the signals received per unit time as they pass through the zero point. The number of zero passages per unit time thus defines the frequency of the respective signal. However, the zero-passage discriminator is unsuitable when the two signal frequencies differ only by a small amount and/or when high ratios of transmission rates to signal frequencies exist.

Other previously known devices measure the time interval between consecutive passages of frequency-modulated signals through the zero point. This elapsed time is compared with a predetermined threshold value which represents the normal duration of the signals received for one frequency. These devices also suffer from the disadvantage that in case of a small difference between the modulating frequencies, the accuracy of the evaluation is diminished. In addition, these devices are unduly expensive when the proper in-phase relation of the transition between the frequencies must be determined.

For the demodulation of a frequency-modulated signals, other previously known devices also measure the half period of the signals by using a counter with a constant clock cycle which during the respective period, is repeatedly counted up to its maximum count. Depending upon the count obtained at the end of the respective half period, a demodulated signal is generated via a low-pass filter arrangement, which signal denotes the respective assigned frequency. Also, with these devices, it is difficult to obtain a proper in-phase evaluation, especially of phase-coherent signals.

These previously known processes all have the common disadvantage that the reproduction of the data signals always requires a low-pass filter arrangement triggered by signals generated by oscillating circuits or digital counters. In particular, these devices are disadvantageous in that signal distortions are caused by transient phenomena from inductors and capacitors.

SUMMARY OF THE PRESENT INVENTION

The present invention provides a process and demodulator for frequency encoded data signals based on digital data processing which does not require any filter arrangement for reproducing the demodulated signal. Moreover, the signal frequencies and signals speeds may be changed without additional costs.

The present invention achieves these advantages by providing a demodulator for demodulating a data signal encoded by pulses of a first and second signal frequency.

For the solution of the problem, a process of the above-described type has been developed according to the invention, which process is characterized in that each pulse front of the input signals which are modulated and transmitted with either the first or second signal frequency controls the generation of a comparison pulse of the second or first normal duration, that the leading edge of the comparison impulses generate the leading edges of the driving pulses and the then following trailing edges of the comparison pulses generate the trailing edges of control pulses which during their duration, effect upwards counting of a storage contents and during their intervals, effect downwards counting of a contents. The attainment of one of two separate threshold levels in the storage contents is interpreted as a criterion for a change-over from first-signal frequency signals to second-frequency signals or from second-frequency signals to first-frequency signals, which criterion is also used for the change-over of the comparison pulses.

The invention is based on the realization that in the case of the use of two modulating frequencies, only the transition between these frequencies must be determined without the need for resonance circuits or filter arrangements to identify the respective frequency. During a continuous evaluation of the received data signals, one of the two signal frequencies is always known. Consequently, the other signal frequency must occur during a frequency change or transition. When each pulse front of the transmitted signals generates a comparison pulse of the duration which corresponds to the signal frequency to be expected, then, in case of a transition to this signal frequency, the duration of the signal-frequency pulses agreeing with the duration of the comparison pulses first of all results in a long uninterrupted control pulse. The control pulse effects a continuous change in the storage contents until the storage contents reach a threshold value. Depending upon the signal or direction of the signal-frequency alternation, an upper or a lower threshold limit is thus attained within the storage contents.

According to the present invention, filter arrangements or low-pass arrangements are not required to generate a signal indicating the transition of the signal frequency. Hence, the present invention is advantageous in that signal distortions previously caused by the after effects of preceding signals are completely eliminated since the comparison pulses are generated only by the signal fronts from the input signal. In addition, digital circuits can be used to detect the change of the storage contents which are relatively inexpensive and yet highly accurate. Moreover, it is possible to establish the upper and lower limits for the change of the storage contents so that signals derived therefrom are not impaired by previously existing switching states.

The possibility of using digital circuits results in the additional advantage that the operational parameters can be changed in a very simple manner. Thus, for example, it is possible to change the signal transmission rate and/or the signal frequencies without the necessity of expensive equipment changes. For such changes, only the comparison times, threshold values, and/or the limiting values for the storage contents must be altered.

According to a further development of the present invention, different speeds are used for changing storage contents with driving pulses having different signs. When the signal frequency is constant, the storage contents oscillate between two values which depend upon the respective duration of the changes. These changes are, of course, limited to the range between the threshold values. Hence, any change of signal frequency of the respective sign alternation may not occur for a certain time. When within this time a signal-frequency change should occur, the determination of this change would normally be associated with a lag, though only a small lag, which would end with the later starting sign alternation. However, when different speeds are used to change the storage contents, it is simple to choose the speeds so different that the above-described lags do not occur. The characteristics curve of the change of the storage contents has a sawtooth pattern, but not a trapezoid pattern.

In a further developed embodiment of the invention, the process can be so carried out that the storage contents are changed at rates by which the storage contents approximate always the same extreme values at constant input frequency. As a result, the above-described characteristic curve of the storage contents shows a constant variation of amplitude over practically any long time period. Thus, it becomes possible to transmit binary data signals of any duration whatsoever since the characteristic curve of the change of the storage contents will not reach either the above-mentioned threshold values or a zero value.

The process according to the invention can be carried out at low cost when the leading edges of data signals pulses control the generation of first comparison pulses and when the trailing edges control the generation of second comparison pulses. Preferably, the leading or the respective trailing edges of the control pulses are initiated at the start or the end of the respective coincidental states of the first and the second comparison pulses.

Since the higher signal frequency has a smaller pulse periods than the lower signal frequency, and since the first comparison pulses are generated only by the leading edges of the pulses and the second comparison pulses are generated only by the trailing edges of the pulses, overlappings or coincidental states of the first and second comparison pulses thus result. The duration of the comparison pulses is equal to the normal duration of the signal pulses and the latter can be calculated as the reciprocal of the frequency. Therefore, the ratios of the overlapping times to the intervals are fixed and can be calculated from the intervals. In one case, this ratio is the difference between the long and short time to the short time, in the other case, this ratio is the difference of the sum of two short times to the long time. Thus, whether the signal frequency is high or low, the storage contents may be changed as each individual pulse of a data signal is received so that a signal frequency transition can be detected within as short a time as possible. These correlations will be made especially clear by an exemplified embodiment of the invention which will be hereinafter described.

Circuitry for carrying out the process according to the invention can be advantageously so designed that for the generation of comparison pulses of different duration, pulse-front controlled time elements are provided which generate output signals of different duration. These signals are coupled to the first inputs of two first AND gates and second inputs of these AND gates are connected with a circuit indicative of the existence of either the first or the second data signals. The outputs of the two AND gates are conducted via an OR gate to the control input of a reversible counter.

This circuit arrangement achieves the result that assuming the existence of the first signal frequency, the comparison pulse have a duration corresponding to that of the second signal frequency. Moreover, with a reversible counter as the storage device the amplitude of the cyclic change of the storage contents during a constant signal frequency can be fixed virtually at random or be adjusted to the speed of the change. For this purpose, it is merely necessary that the corresponding desired outputs of the reversible counter are activated or not activated.

When comparison pulses of longer duration are to be generated, it is advantageous to provide two time elements one of which is triggered by the leading edge and the other of which is triggered by the trailing edges of the data signals. These time elements have outputs that via a second AND gate are connected with the first input of one of the first AND gates. This circuitry design makes it possible to realize the above-described principle of using coincident states of the longer comparison pulses for the generation of driving pulses.

BRIEF DESCRIPTION OF THE DRAWING

As to additional characteristics of the invention and the advantages associated therewith, see the following preferred embodiment of the invention which is described with the aid of the attached drawing, in which:

FIGS. 2a–2d show different phase positions of a signal-frequency transition which are depicted at various points of the circuit arrangement shown in FIG. 1.

DETAILED DESCRIPTION OF THE PRESENT INVENTION

Figure 1:
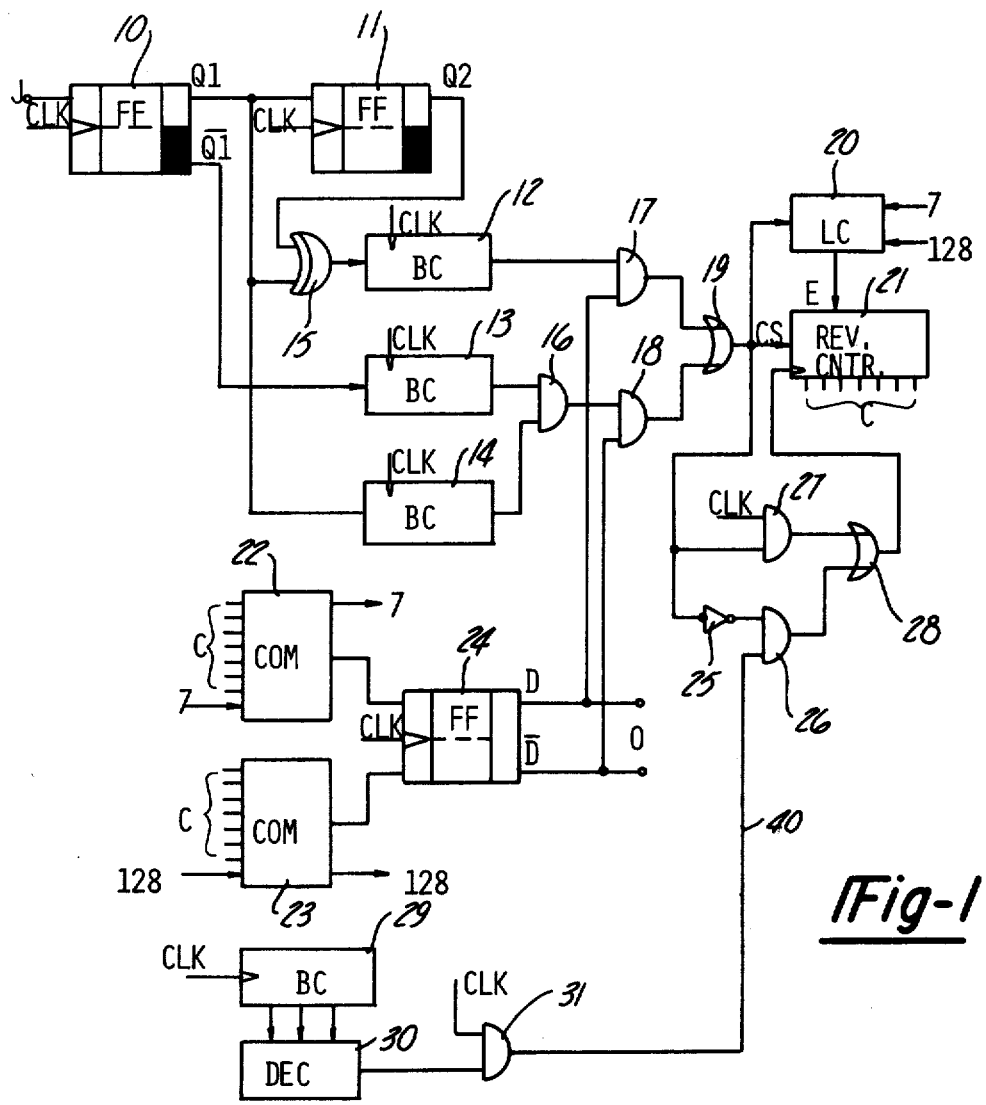
FIG. 1 shows a block diagram of a circuit arrangement of the present invention.

The circuit arrangement shown in FIG. 1 for carrying out the process of the invention has an input J and an output O. A two-stage shift register is formed by two flip-flop circuits 10 and 11 and controlled by the operation cycled CLK, a clock pulse. Three binary counters 12, 13 and 14 operate as time elements and a reversible counter 21, the storage contents of which may be either incremented or decremented in dependence on the level of the counter control input CS. In addition, two comparators 22 and 23 as well as a control unit control the clock cycle of the reversible counter 21, and the control unit comprises a binary counter 29, a decoder 30, an AND gate 31, and logic gates 25 to 28. The gates 25 to 28 are not required when one uses a decoder 30 which can be programmed or changed over and which will be described later on.

The two-stage shift register comprising the two flip-flop circuits 10 and 11 has outputs Q1, $\overline{Q1}$, and Q2 which are connected to the counter inputs of the three binary counters 12, 13, and 14. The outputs Q1 and Q2 are gated through an EXCLUSIVE OR gate 15 to the input of the binary counter 12 whereas the output Q1 triggers the binary counter 13 and the output Q1 also triggers the binary counter 14. Due to the switching time delay of flip-flop circuit 11, gate 15 generates a short square pulswe at its output at the leading and trailing edge of Q1. The outputs of the binary counters 12, 13 and 14 are fed into AND gates 16 or 17 which via a logic circuit comprising an AND gate 18 and an OR gate 19 are connected with the forward-backward counting control input CS of the reversible counter 21. An interlock circuit 20 is connected to said counter 21 for a purpose which will be described later on. Via the logic elements 25 to 28, the clock pulse for the counter 21 is introduced at the clock cycle input. In dependence the level CS, either the operation cycle CLK via gate 27 or the input pulses from a line 40 form the clock pulse for the counter 21. The frequency of this clock cycle is dependent upon the output signals of the binary counter 29 and upon the decoder 30 generating signals through the AND gate 31 which are interconnected with the operation cycle CLK of the circuit arrangement; the function of the binary decoder 29 will be described later on.

The signal at the outputs C of the reversible counter 21 are compared with an upper or lower threshold value. Preferably the lower threshold is seven and the upper threshold is 128 for reasons which will be described later on. For this purpose, the output signals C are fed into the inputs of two comparators 22 and 23 which compare the outputs C to the present threshold values. Depending upon the respective result of the comparison either comparator 22 or comparator 23 generates an output signal to a flip-flop circuit 24 having outputs D and $\overline{D}$. The condition of outputs D and $\overline{D}$ is representative of the binary value of the frequency encoded binary input data signals. This signal is fed to the output O of the circuit and also forms the second input for the AND gates 17 and 18.

As an example, assume that the transmission speed of the data signals is 1200 baud and the signal frequencies are 1300 Hz and 2100 Hz. Accordingly, the binary counters 12, 13, and 14 operating as timing elements generate output signals which have the normal durations of 384 usec corresponding to 1300 Hz and 238 usec corresponding to 2100 Hz. In particular, the binary counter 12 is collated to the frequency of 2100 Hz so that the counter 12 generates an output signal pulse lasting 238 usec whenever a pulse front (leading or trailing edge of a pulse) from input J is sensed. Similarly, the two counters 13 and 14 are collated to the frequency of 1300 Hz such that the counter 13 generates a pulse lasting 384 usec at the trailing edge of a data signal pulse while the counter 14 generates a pulse lasting 384 usec at the leading edge of a data signal pulse at the input J. Reiterating, the three binary counters 12, 13, and 14 are triggered by pulse fronts whenever the frequency-modulated signal from input J passes through zero. The pulse-front control at the zero passages is possible via the two-stage shift register having the two flip-flop circuits 10 and 11. Thus the output pulses generated by the binary counters 12, 13, and 14 occur each time a zero passage of the frequency-modulated signals or, in other words, a pulse front is received at the input J.

Each binary counter 12, 13, and 14 has a clock timing pulse triggered by the operation cycle CLK for controlling the counting operation. When, for example, the clock frequency CLK of 511.5 kHz is used, 196 timing pulses are needed for the generation of the signal having a duration of 384 usec whereas 122 timing pulses are needed for the generation of a signal lasting 238 usec. For equalizing clock tolerances as well as frequency-modulation tolerances, 202 pulses are preferably used for the long duration while 117 pulses are used for the short duration.

A special feature of the circuit arrangement is that in the case of two known signal frequencies, the present status of the data signal is always determined by the last received signal frequency. Thus, the output signals of the binary counters 12, 13, and 14 are selectively switched into circuit by the AND gates 17 and 18 depending upon the signal frequency to be expected in each case. For example, when the lower frequency has been received, the higher frequency is expected (in order to produce a frequency transition) and thus the short duration pulses from counter 12 are gated through AND gate 17 to the counter 21 while the AND gate 18 is disabled. Conversely, when the high frequency has been received, the lower frequency is expected, and the combination of the timing signals of longer duration generated by the two counters 13 and 14 are gated through AND gate 18 to the counter 21. In this second case, the AND gate 17 is disabled. The selective enabling and disabling of AND gates 17 and 18 will be later described.

As will be later described, the counter 21 is controlled so that with the example, the countercounts forwards at a clock frequency of 511.5 kHz, but counts backwards with a slower clock frequency which is in the ratio of 5 : 8 with the forward counting speed.

When reversible counter 21 counts to one of the threshold values, the flip-flop circuit 24 is switched so that the flip-flop outputs D and $\overline{D}$ reverse, as is well known in the field. The two outputs D and $\overline{D}$ of the flip-flop 24 form the second inputs to the two AND gates 17 and 18. Therefore, in dependence upon the level of the flip-flop outputs D and $\overline{D}$, either the short duration timing signals from the counter 12 are gated through the AND gate 17 or the longer duration timing pulses from the counters 13 and 14 are gated through the AND gate 18. The outputs from AND gates 17 and 18 are combined by the OR gate 19 and fed into the control input CS of the counter 21 which determines the counting direction for the counter 21.

The attainment of either the upper or lower threshold value by the reversible counter 21 is determined by the two comparators 22 and 23. For example, signals corresponding to the lower threshold value of the count of 7 and corresponding to the upper threshold value of the count of 128 are fed into the comparators 22 and 23 and are compared with the output signal C from the counter 21. Depending upon which threshold value is reached, a signal from either the comparator 22 or the comparator 23 switches the flip-flop circuit 24 and thus switching the state of the outputs D and $\overline{D}$.

The previously mentioned division of the clock frequency of 511.5 kHz by a 5 : 8 ratio is effected by the binary counter 29 and the decoder 30. The binary counter 29 has three counting stages and an output corresponding to each counting state. The operation cycle CLK forms the input to the counter 29. The outputs from the counter 29 are fed into the decoder 30 which decodes the signals to the frequency-division ratio. In the present example, the division ratio is 5 : 8 so that for every eight pulses from the cycle CLK the decoder generates five pulses which are gated through AND gate 31 by the operation cycle CLK and fed along line 40 to the AND gate 26. When a backward counting signal occurs, at CS, the AND gate 26 is enabled by an inverter 25 so that the slower clock cycle is fed through an OR gate 28 and into the input of the counter 21. As is evident, the clock frequency division can be switched over by simply switching over or programming the decoder 30 in a manner still to be described.

Summarizing, the circuit arrangements supplying the counting signal to the reversible counter 21 comprises two AND gates 26 and 27, the OR gate 28 and the inverter 25. The normal operation cycle CLK is fed into the AND gate 27 and the forward counting signal CS forms the second input to AND gate 27 so that the forward counting operates via the OR gate 28 at the normal clock frequency CLK. During downward counting, the clock signal having a divided or lower frequency is fed from the AND gate 31 along line 40 and into the AND gate 26. The inverter 25 enables the AND gate 26 during a backward counting signal and the AND gate 27 is disabled by the downward counting signal. In this manner, the backward counting operates at the divided clock frequency which has a lower frequency than the operation cycle CLK and is at a 5 : 8 ratio to the operation cycle CLK for the example shown.

With the aid of FIGS. 2a–2d, it is now described how the abovediscussed circuit arrangement operates in various cases of transitions between the signal frequencies. In FIGS. 2a to 2d, the signal patterns are depicted as the respective function of the time t for the input J, the output O, the output(s) B C from the binary counters 12, 13, and 14, the control input CS of the counter 21, and for the output C of the counter 21.

Throughout FIGS. 2a–2d, the signal-frequency transition or phase transition occurs at the place which is characterized by the vertical phantom lines at the time ts. FIG. 2a shows a transition from the lower signal frequency to the higher signal frequency which exactly coincides with the end of a period of the lower signal frequency and the beginning of a period of the higher signal frequency. FIG. 2b shows a similar transition but within the higher signal frequency. FIG. 2c shows a transition from the high signal frequency to the lower signal frequency whereby the instant of the change is exactly located at the end or the beginning of the respective period and finally, FIG. 2d shows a transition like FIG. 2c but within the period of the lower signal frequency.

The data signal at the input J of the arrangement depicted in FIG. 1 is shown in FIG. 2a at J. This data signal consists of pulses of a time t, whereby the period signal has the double duration. At the instant ts, these signals change to signals of the high frequency having a shorter pulse duration $t_2$ which is correspondingly shorter dimensioned. The output signals of the binary counters 12, 13, and 14 are depictedas shown. During the occurrence of either a leading or trailing edge of the data signals at input J having a lower frequency, the binary counter 12 is triggered, and at each leading edge of the data signal generates an output comparison pulse having a duration which corresponds to the normal duration $t_2$ of the short pulses. These signals are gated through the AND gate 17 (FIG. 1) provided a signal is present at the output D of the flip-flop circuit 24. These signals are then gated through the OR gate 19 and fed as control pulses to the control input CS of the reversible counter 21 so that the counter 21 down counts. Each output pulse generated by the binary counter 12 thus effects a down counting operation of the counter 21 whereas between these pulses, a forward counting operation is carried out. As has been already described, the forward counting operation is at a faster rate than the backward counting operation due to the described frequency division in a 5 : 8 ratio of the clock cycles. Thus a long as the lower frequency remains at the input J, the counter 21 continuously counts starting from an upper extreme value of the counter 21, counting slowly downwardly and fast upwards using the above-mentioned count-down ratio of 5 : 8, which ratio also corresponds to the ratio of the times $t_2$ to $t_1$, as becomes evident from the graphical representation in FIGS. 2a–2d.

When a transition to the higher signal frequency takes place, the binary counter 12 is still triggered in the above-described manner. However, the distance or elapsed time of the control signals fronts form each other corresponds to the duration of the output signal of the counter 12. Thus, after the time ts has elapsed, the comparison signals of the counter 12 result in the generation of a backward counting pulse of long duration at the control input CS of the counter 21. In this manner, a backward counting operation is carried out which is of longer duration when compared with the previously described state. This backward counting takes place until the contents C of the counter 21 reach the lower threshold value. This lower threshold value is reached at the instant td, and then, the flip-flop 24 (FIG. 1) is switched by the comparator 22 so that the output signal D of the flip-flop 24 is switched to a logically low state. This in turn disables the AND gate 17 and enables the AND gate 18 so that the two binary counters 13 and 14 control the input CS to the counter 21 via the AND gate 18.

With the AND gate enabled, a backward counting operation occurs only during the simultaneous existence of the two long lasting output signals of the binary counters 13 and 14 (due to the AND gate 16) whereas if the output of either counter 13 or 14 is in a low logical state, the counter 21 counts forward. FIG. 2a depicts this state, the initiation of which depends upon the switchover of the outputs of D and $\bar{D}$ of the flip-flop circuit 24.

FIG. 2b shows conditions similar to those of FIG. 2a except that the frequency transition does not occur at the end or the beginning of a period of the respective signals, but rather the frequency transition is located within the period of the lower frequency. It is evident that after the frequency transition, a forward counting operation is again initiated and carried out. However, the forward count ends at the initiation of the pulse front for the high frequency input at J which occurs after a relatively short duration. Next, a backward counting signal of long duration is generated in the above-described manner, which signal controls the direction of count of the counter 21 until it reaches its lower threshold value whereupon the output signals D and $\bar{D}$ of the flip-flop circuit 24 are switched over. This switchover in turn results in the switchover of the two AND gates 17 and 18 so that similarly to the pattern depicted in FIG. 2a, the counter 21 counts forwards and backwards, now starting from the lower threshold value of the counter 21.

It becomes evident at this point that independently of the phase position of the signal frequency transition, the new signal frequency is always perceived at the instant $t_d$. This is also valid for the cases shown in FIGS. 2c and 2d.

In contradistinction to the case of FIG. 2a, FIG. 2c shows the reverse case, i.e., the transition from the high signal frequency to the lower signal frequency. Accordingly, it is first illustrated how the combination of the output signals of the two binary counters 13 and 14 controls the forward or backward counting operation, thus continuing the pattern of FIG. 2a to a certain degree. When the transition to the lower signal frequency occurs, a prolonged forward counting signal $\overline{CS}$ is formed which controls the direction of count for the counter 21 until the upper threshold value has been reached. Then a switchover occurs at the circuit output O via the comparator 23 and the flip-flop 24, by which switchover the output signal of the binary counter 12 is switched into circuit via the AND gate 17. Subsequent states then correspond to the initial states shown in FIG. 2a.

Analogously to FIG. 2b, FIG. 2d shows the frequency transition within the period, in this case, however, from the high signal frequency to the lower signal frequency. As in FIG. 2c, the output signals of the two binary counters 13 and 14 are first combined by AND gate 16 and this combination is subsequently replaced by the output signal from the binary counter 12. Also in this case, a forward counting operation first takes place depending upon the counting signal depicted at CS and is then followed by a short-time backward counting operation which occurs during the short-time combination of the two binary counters 13 and 14. Next, an additional forward counting takes place until the upper threshold value has been reached whereupon the following state corresponds to the initial state in FIG. 2a or FIG. 2b.

The following conclusions can be derived from the various cases of a signal frequency transition which have been described above with the aid of FIGS. 2a to 2d. When the rates for the forward and backward counting operations of the reversible counter 21 are properly chosen, i.e., according to the ratio of the two signal frequencies, it becomes possible to cause the count of the reversible counter 21 to oscillate between two constant extreme values, provided that the signal frequency remains constant. These two extreme values lie in a range between the two threshold values. Moreover, when the counting rates are thus adjusted to the signal frequency ratio for each of the cases depicted in FIGS. 2a–2d, then it becomes evident that the same time is always required for perceiving the signal-frequency transition. This perception occurs each time at the instant $t_d$ which instant remains the same for all depicted cases in FIGS. 2a to 2d and is shown in FIGS. 2a to 2d by the phantom line. Thus, the difference between the times $t_s$ and $t_d$ represents the interpretation delay.

In addition, FIGS. 2a–2d show that the extreme values of the counter agree with the threshold values. This is possible when the counting range of the reversible counter 21 is chosen not larger than the range between the two threshold values which for the example selected here, lie at 7 or 128 counting states, respectively. When other frequency-response ratios are present than those in this example, it may become necessary that the counting range into one and/or the other direction is chosen larger than the threshold value range. The interlock circuit 20 is provided for preventing the reversible counter 21 from falling below or exceeding these counts during the counting operations. The interlock circuit 20 operates in dependence upon the forward-backward control signal which is fed into the control input CS of the counter 21. The interlock circuit 20 also receives the threshold signals 7 and 128 which are generated from the two comparators 22 and 23 as comparison signals. The output signal of the interlock circuit is fed into an interlock input E of the reversible counter 21 and causes the respective count to be interlocked when it reaches the lower or upper threshold value in dependence upon the respective direction of the count. Simultaneously, the switchover takes place at the outputs of the flip-flop circuit 24, the forward-backward signal is switched over and the interlock is released for the following counting operation carried out in the opposite direction. This switching measure has the effect that the counting range of the reversible counter 21 is confined within the threshold value range of 7 to 128. This results in a simplification for the circuit, and a sawtooth wave pattern has the storage contents of the reversible counter 21 as shown in FIGS. 2a–2d.

The binary counter 29, which controls the frequency division of the counting rate at the decoder 30, advantageously comprises a number of stages dimensioned according to a preferably small count-down ratio. In the case of the above-described example involving a signal rate of 1200 baud, three counting stages are sufficient for the binary counter 29. The latter operates in cycles and generates counting signals at its ouputs wich correspond to the binary values from 0 to 7. Then, the decoder can be programmed so that during a counting period of 8 counting stages, five output pulses are generated from the decoder 30 which are spaced as uniformly as possible and which are to be combined with the operation cycle CLK by the AND gate 31.

The circuit arrangement as shown in FIG. 1 can then be switched over to other signal speeds. For this purpose, it is merely necessary that the decoder 30 is accordingly programmed to another count-down ratio and that the binary counters 12, 13, and 14 are adjusted for generating such time signals which at another signal speed, make possible a comparison of the above-described type with the respective pulse durations of the arriving data signals.

Figure 3:
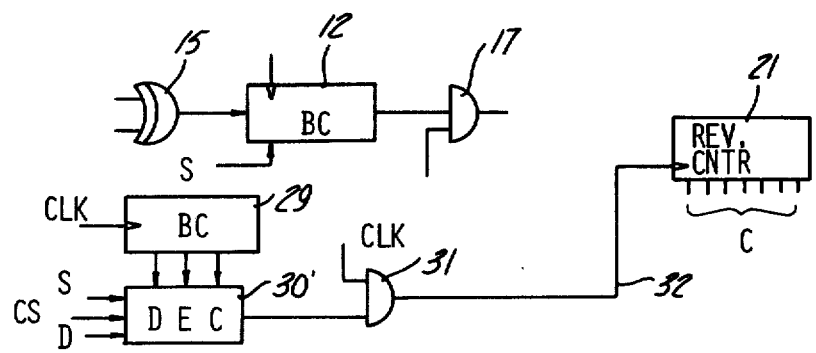
FIG. 3 is a partial block diagram similar to FIG. 1 but showing a modification thereof.

Referring now to FIG. 3, for the switchover of the pulse rates, a decoder 30' is provided with three control inputs S, CS and D into which signals are fed which indicate the speed of the data signals received, the forward-backward counting operations, and the state of the data output. The decoder 30' permits a switchover of the pulse rates in dependence upon the direction of the count, such that the logic elements 25 to 28 are rendered unnecessary. Accordingly, FIG. 3 shows a interconnection 32 which directly leads from the AND gate 31 to the counter input of the reversible counter 21. The following Table shows how the count-down ratios for the two signal speeds of 1200 and 600 baud have to be adjusted when the signal frequencies amount to 1300/2100 Hz or 1300/1700 Hz. Since in this case, only the higher frequency is changed, only the binary counter 12 needs to be adjusted by means of the control signal which occurs at the control input S and indicates the signal speed.

TABLE

| Signal Speed Bauds | S[1,2] | D | CS | Count-Down Ratio |
|---|---|---|---|---|
| 1200 | 1 | 1 | 1 | 5 : 8 |
| 1200 | 1 | 1 | 0 | 1 : 1 |
| 1200 | 1 | 0 | 1 | 5 : 8 |
| 1200 | 1 | 0 | 0 | 1 : 1 |
| 600 | 0 | 1 | 1 | 1 : 4 |
| 600 | 0 | 1 | 0 | 1 : 1 |
| 600 | 0 | 0 | 1 | 9 : 32 |
| 600 | 0 | 0 | 0 | 2 : 3 |

[1] (1 = 1300/2100 Hz)
[2] (1 = 1300/1700 Hz)

This table makes it evident that at the signal speed of 600 bauds for the first signal frequency, the forward and backward counting operations require selection of countdown ratios which differ from those selected for the second signal frequency. This results from the consideration that the signal frequencies 1300 or 1700 Hz selected at a signal-frequency speed of 600 bauds form other pulse ratios, hence, when as high an interpretation exactness as possible and the therewith associated sawtooth characteristic as depicted in FIGS. 2a–2d have to be obtained and when the extreme values of the count have to agree with the specified threshold values, there are required different pitches in the sawtooth characteristic, depending upon whether the one or the other signal frequency is present. The example of a signal speed of 600 bauds requires a five-stage binary counter 29 which has to generate the counting value 32. As to the nine output signals then to be emitted from this counter, these signals have to be spaced as uniformly as possible by the decoder 30 within the time period taken by the 32 counting signals.

What is claimed is:

1. A method for determining the transition between a first and second signal frequency of a data signal wherein the data signal is modulated with different signal frequencies, comprising the steps of:

generating a comparison pulse of a first or second duration at each pulse front of said data signal during said second or first signal frequency, respectively, generating a control pulse at the leading edge of each comparison pulse, terminating the control pulse at the trailing edge of each comparison pulse, changing the contents of a storage means in a first direction during said control pulses, changing the contents of said storage means in a direction opposite from said first direction during the intervals between said control pulses, and establishing a pair of separated threshold values whereby the attainment of one of said threshold values by said contents of storage means is interpreted as a transition of the data signal from one signal frequency to the other signal frequency, which transition is also used for the change over of the duration of the comparison pulses.

2. Method according to claim 1, characterized in that the change of the contents of the storage means in opposite directions is brought about at different speeds.

3. Method according to claim 2, characterized in that the change of the contents of the storage means is brought about by speeds which at constant signal frequency, result in about the same extreme values of the storage contents.

4. Method according to claim 1, characterized in that the change-over of the duration of the comparison pulses is brought about by a comparison of the contents of the storage means with said separated threshold values, which comparison is carried out continuously.

5. The method according to claim 1, and characterized in that during the higher frequency data signal, the control pulses are generated only during overlapping comparison pulses.

6. A circuit arrangement for generating said control pulses according to claim 1 comprising at least two pulse-front controlled time elements having their inputs operatively coupled to the data signal, wherein said time elements generate the comparison pulses of different duration which are fed into the first inputs of two first AND gates, that the second inputs of said AND gates are connected with a circuit means which generate signals representative of the existence of either the first or the second data signal frequency and that the outputs of the two AND gates are fed via an OR gate into the control input of a reversible counter wherein said control pulses are generated at the output of said OR gate.

7. A circuit arrangement according to claim 6, wherein for the generation of one of said comparison pulses, one of said time elements comprises two second time elements, one of which is triggered only by the leading edge of said data signal and the other of which is triggered only by the trailing edge of the data signal wherein the outputs of the second time elements are connected with the first input of one of the first AND gates via a second AND gate.

8. A circuit arrangement according to claim 6, wherein the ouput of the reversible counter is connected to the first comparison input of two comparators and including means for feeding one of said threshold values into the second comparison input of one of said comparators and the other threshold value into the second comparison input of the other comparator.

9. A circuit arrangement according to claim 8, wherein the ouputs of the two comparators are connected to opposite inputs of a flip-flop wherein the outputs of the flip-flop signalize the existence of the first or the second signal frequency of said data signal.

10. A circuit arrangement according to claim 6, wherein the control input of the reversible counter is connected with its counter input via an AND gate wherein the second input of said last mentioned AND gate is coupled to an operational clock cycle.

11. A circuit arrangement according to claim 10, wherein the last mentioned AND gate is connected with the counter input via an OR gate having its second input coupled to the output signal of an AND gate which is enabled by an inverted version of the signal at the control input of the reversible counter, the second input of the last mentioned AND gate being coupled to the output of a frequency division means which divides the operational clock cycle by a predetermined ratio.

12. A circuit arrangement according to claim 11, wherein said frequency division means further comprises a binary counter, the outputs of which are connected with a decoder adapted to generate a predetermined number of output pulses in response to a predetermined number of input pulses.

13. A circuit arrangement according to claim 6, wherein said time elements are binary counters.

14. A circuit arrangement according to claim 6, and including an interlock circuit coupled to the reversible counter and adapted to limit the upper and lower count in said counter.

15. A circuit arrangement according to claim 14, wherein the interlock circuit is controlled by the output signals generated by the comparators.

16. An apparatus for determining the transition between a first and second signal frequency of a data signal wherein the data signal is modulated with different signal frequencies, comprising:
means for generating a comparison pulse of a first or second duration at each pulse front of said data signal during said second or first signal frequency, respectively,
means for generating a control pulse at the leading edge of each comparison pulse and for terminating the control pulse at the trailing edge of each comparison pulse,
means for changing the contents of a storage means in a first direction during said control pulses and for changing the contents of said storage means in a direction opposite from said first direction during the intervals between said control pulses, and
means for establishing a pair of separated threshold values, and means for comparing the contents of said storage means with said threshold values whereby the attainment of one of said threshold values by contents of said storage means is interpreted as a transition of the data signal from one signal frequency to the other signal frequency, which transition is also used for the change over of the duration of the comparison pulses.

17. The apparatus as defined in claim 16, and including means for limiting the contents of said storage means between the separated threshold values.

18. The apparatus as defined in claim 16, wherein said storage means comprises a reversible counter and wherein said control pulses are coupled to the direction control input of said reversible counter.

19. The apparatus as defined in claim 18, and including frequency division means coupled to the counting input of said reversible counter and adapted to provide a first predetermined counting frequency to said reversible counter during said control pulses and a second predetermined counting frequency to said reversible counter during the interval between said control pulses.

20. The apparatus as defined in claim 16, wherein said means for generating comparison pulses comprises at least two timing elements adapted to generate output pulses of a predetermined duration at each pulse front of said data signal.

21. The invention as defined in claim 16, and further comprising a first comparator for comparing the contents of said storage means with one threshold value and a second comparator for comparing the contents of said storage means with the other threshold value, wherein each comparator generates an output signal upon the attainment of its respective threshold value in said storage means representative of the threshold value attained.

22. The invention as defined in claim 21, wherein the outputs of the comparators are coupled to opposite inputs of a flip-flop circuit the output of which is indicative of the data signal frequency.

23. The invention as defined in claim 16, wherein the means for generating a control pulse at the higher signal frequency further comprises means for generating said control pulse during overlapping comparison pulses.

* * * * *